US010000344B2

(12) United States Patent
Philipp

(10) Patent No.: US 10,000,344 B2
(45) Date of Patent: Jun. 19, 2018

(54) PRODUCT FLOW REGULATOR

(71) Applicant: Rotzinger AG, Kaiseraugst (CH)

(72) Inventor: Kurt Philipp, Grenzach-Whylen (DE)

(73) Assignee: Rotzinger AG, Kaiseraugst (CH)

(*) Notice: Subject to any disclaimer, the term of this patent is extended or adjusted under 35 U.S.C. 154(b) by 0 days. days.

(21) Appl. No.: 15/517,979

(22) PCT Filed: Oct. 12, 2015

(86) PCT No.: PCT/EP2015/073575
§ 371 (c)(1),
(2) Date: Apr. 10, 2017

(87) PCT Pub. No.: WO2016/058997
PCT Pub. Date: Apr. 21, 2016

(65) Prior Publication Data
US 2017/0291776 A1 Oct. 12, 2017

(30) Foreign Application Priority Data
Oct. 13, 2014 (CH) ........................... 1557/14

(51) Int. Cl.
*B65G 47/00* (2006.01)
*B65G 47/51* (2006.01)
(Continued)

(52) U.S. Cl.
CPC ..... *B65G 47/5127* (2013.01); *B65G 47/1492* (2013.01); *B65G 1/1376* (2013.01)

(58) Field of Classification Search
None
See application file for complete search history.

(56) References Cited

U.S. PATENT DOCUMENTS 4,428,708 A * 1/1984 Burt ..................... B65G 1/0421
414/275
4,554,873 A * 11/1985 Rex ....................... B61L 23/005
104/88.04

(Continued)

FOREIGN PATENT DOCUMENTS

DE 44 00 925 A1 7/1995
EP 1 586 520 A1 10/2005
(Continued)

OTHER PUBLICATIONS

Search Report issued Nov. 19, 2014 in German Patent Application No. CH01557/14 (with English translation of category of cited doucments).

(Continued)

*Primary Examiner* — Kavel Singh
(74) *Attorney, Agent, or Firm* — Oblon, McClelland, Maier & Neustadt, L.L.P.

(57) ABSTRACT

A product flow regulator for temporary storage of products includes a frame, a conveying mechanism, and product carrier gondolas, which are conveyed with products from a product inlet area to a product outlet area and back empty. The frame includes a stationary guide track, along which the product carrier gondolas circulate self-controlled. The gondolas includes a drive mechanism and electrical control devices, which enable individual independent circulation.

7 Claims, 3 Drawing Sheets

(51) Int. Cl.
*B65G 1/06* (2006.01)
*B65G 1/12* (2006.01)
*B65G 47/14* (2006.01)
*B65G 1/137* (2006.01)

(56) References Cited

U.S. PATENT DOCUMENTS

| | | |
|---|---|---|
| 5,505,586 A | 4/1996 | Lichti |
| 5,588,790 A | 12/1996 | Lichti |
| 5,636,722 A | 6/1997 | Koop |
| 7,138,596 B2 * | 11/2006 | Pippin .................. B07C 3/02 209/584 |
| 7,381,022 B1 | 6/2008 | King |
| 7,861,844 B2 | 1/2011 | Hayduchok et al. |
| 8,011,492 B2 | 9/2011 | Davi et al. |
| 8,104,601 B2 | 1/2012 | Hayduchok et al. |
| 8,276,740 B2 | 10/2012 | Hayduchok et al. |
| 8,622,194 B2 | 1/2014 | DeWitt et al. |
| 2005/0232732 A1 | 10/2005 | Philipp |
| 2007/0125727 A1 | 6/2007 | Winkler |
| 2008/0277243 A1 | 11/2008 | Hayduchok et al. |
| 2010/0108464 A1 | 5/2010 | Davi et al. |
| 2011/0094854 A1 | 4/2011 | Hayduchok et al. |
| 2012/0128454 A1 | 5/2012 | Hayduchok et al. |
| 2013/0092508 A1 | 4/2013 | DeWitt et al. |
| 2014/0124332 A1 | 5/2014 | Hayduchok et al. |
| 2014/0182242 A1 | 7/2014 | Winkler |
| 2014/0193227 A1 | 7/2014 | Winkler |

FOREIGN PATENT DOCUMENTS

| | | |
|---|---|---|
| WO | WO 95/12537 A1 | 5/1995 |
| WO | 2007/041996 A1 | 7/2007 |
| WO | WO 2007/116643 A1 | 10/2007 |
| WO | WO 2008/095861 A1 | 8/2008 |

OTHER PUBLICATIONS

International Search Report dated Jan. 28, 2016 in PCT/EP2015/073575, filed Oct. 12, 2015.

* cited by examiner

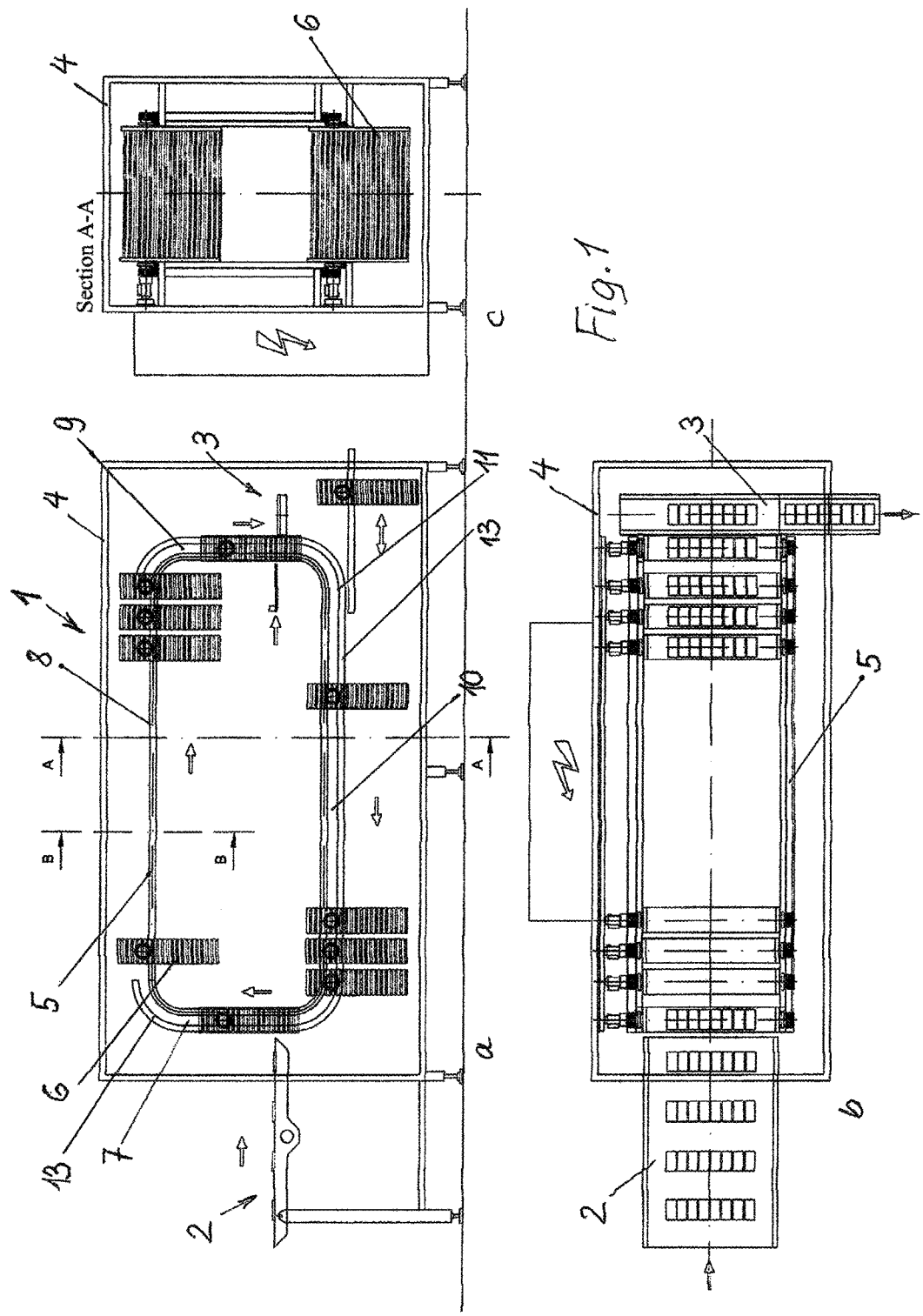

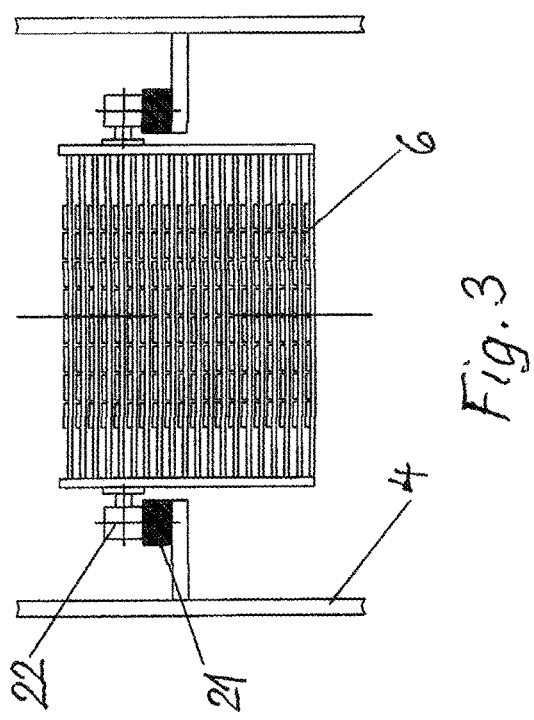
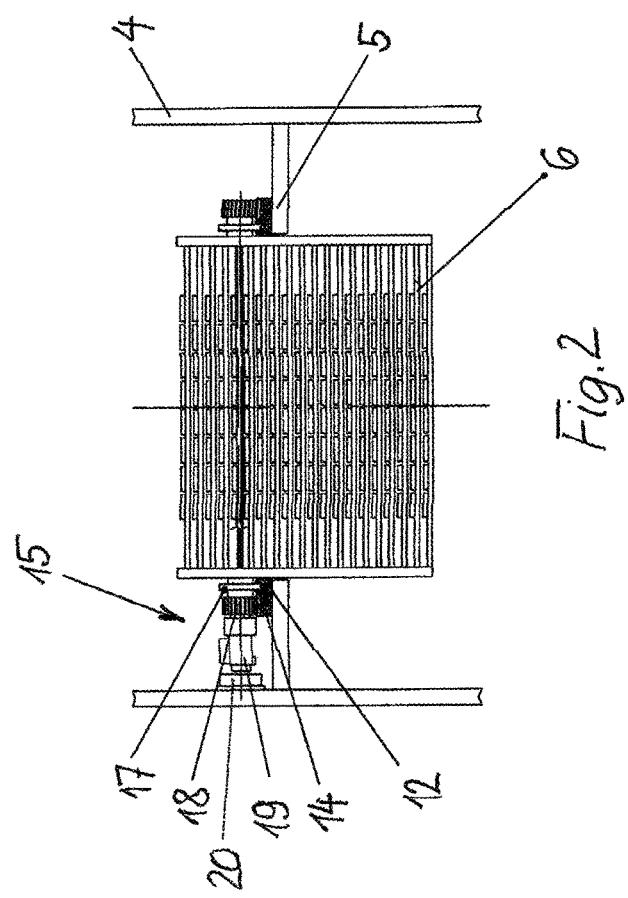

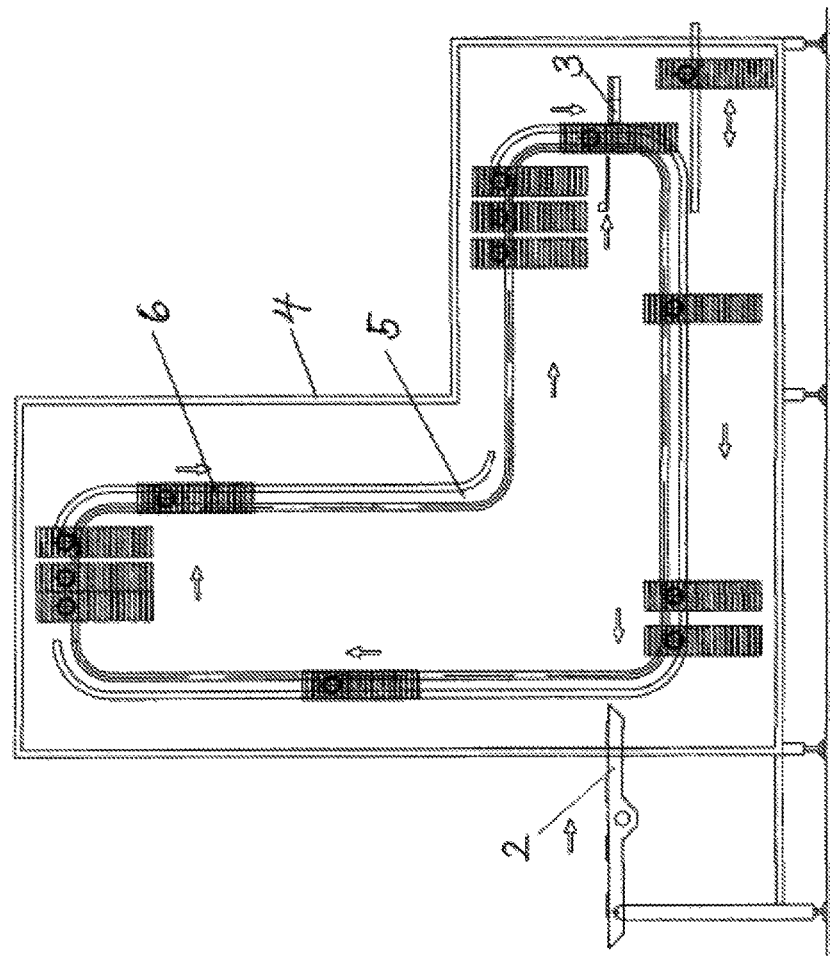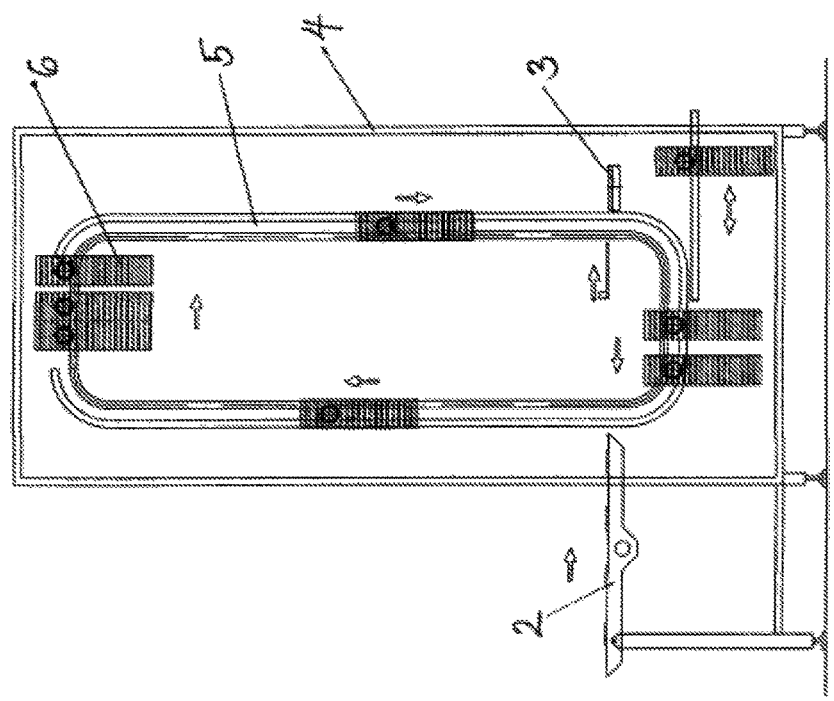
Fig. 4
Fig. 5

PRODUCT FLOW REGULATOR

The invention relates to a product flow regulator for temporarily storing products with a frame, conveyor means and product carrier gondolas, which are conveyed with products from a product inlet area to a product outlet area and back empty.

Product flow regulators are most commonly used when freshly produced piece goods such as chocolate bars, candy bars and biscuits need to be carried to a packaging system. These piece goods are produced in series and should go to the packaging machine by the shortest route. The packaging process can be subject to disruptions and interruptions. On the other hand, the product should be produced continuously at a constant speed to achieve consistent quality. To solve this problem, product flow regulators are used between production and packaging, as described for example in EP 1586520. Given interruptions in the downstream packaging system, the product flow regulator labeled there as intermediate storage can hold the continuing production on product lines for a certain time. This amount of product is stored temporarily in the product flow regulator to be able to then release it at a higher speed when the packaging system starts up again. This is done during the production on the "first-in-first-out" principle and avoids the discarding of valuable product.

The freshly produced product lines are loaded at the inlet of the product flow regulator on product carrier trays. These product carrier trays are arranged one on top of the other and designed to be joined in groups into a product carrier gondola labeled as transport rack. These product carrier gondolas are generally moved on both sides with circulating chains and devices arranged in pairs from the inlet into the product flow regulator to its outlet, and if there are interruptions in the packaging are also backed up. The backup zone with product is usually in the upper area of the product flow regulator before its outlet. In the outlet of the product flow regulator, the product carrier gondolas are unloaded and the products are sent on conveyor belts to the downstream packaging machines. The emptied product carrier gondolas then go in the lower area of the product flow regulator through a backup zone back to its inlet, to then be reloaded with product lines. The product flow regulator is therefore always defined by an inlet area in which the product carrier gondolas are loaded with product, an upper backup zone through which the interruptions and disruptions of the downstream packaging system are compensated, and an outlet area in which the product lines are unloaded for the packaging system, as well as a backup zone in the lower return run where the emptied product carrier gondolas wait for their next speed-dependent loading. The product flow regulator thus has a certain number of product carrier gondolas, which are recirculated in a circle and loaded at the inlet with product lines and unloaded at the outlet.

All systems known, for example, from EP 1586520, DE 60308229 and other documents work with simple product carrier gondolas that are circulated at very high mechanical and electrical cost. This means that all the necessary mechanisms to circulate the simple gondolas are located stationary in each functional area of the machine. This requires a large number of drives with the associated sensors and a high cost for their electrical control and electrical installation.

The known systems also have the disadvantage that with each change of direction from vertical to horizontal and vice versa, there must be a transfer of the gondolas from one conveyor to the next. These transfer movements reduce the system's performance, because this process takes a certain amount of time during which the circulation of the product carrier gondolas must be interrupted.

Another disadvantage of the known systems is that the conventional mechanical backup of the product carrier gondolas causes noise and mechanical stress on the gondolas, and also stress on the product itself from the vibrations and oscillations this causes.

The invention is based on the object of designing a product flow regulator that manages without this high cost and avoids the named disadvantages.

According to the invention, this object is solved by the gondolas being equipped with individual independent drive devices and their own sensors, and by circulating in a self-controlled manner on fixed guide and transport rails.

The proposed new product flow regulator thus functions on a different principle than the intermediate storage known from the prior art. The system causing the transport of the gondolas with frame, conveyor chains, drives, etc. is replaced by a frame having only fixed guide and conveyor rails on which the gondolas circulate. The product carrier gondolas, by contrast, are conceptualized and designed such that they move self-controlled through the product flow regulator.

A stationary circulating guide track is installed on both sides in the product flow regulator frame. The mobile product carrier gondolas are received in this guide track and then can move self-controlled along this guide track.

Each product carrier gondola is equipped on both sides with drive and guide means that enable each product carrier gondola to be moved individually through the various functional areas of the product flow regulator along this guide track. The shape of this circulating guide track is arbitrary in terms of height and length. In this way, existing premises can be optimally utilized.

Below the outlet of the product flow regulator, individual product carrier gondolas can be backed out and slid back in, in a defined and automated manner, by opening the guide track. This is often used when the product carrier gondolas must be cleaned externally. The process of sliding individual product carrier gondolas in and out can also take place during operation.

Through the new concept, the product carrier gondolas can be individually and continuously moved and held along the guide track. The required backup in the backup zones occurs in a defined manner without the individual product carrier gondolas mechanically touching each other. The change of direction from vertical to horizontal and vice versa can be carried out continuously, without mechanically complicated transfer movements. Due to the contactless backup possibility for the product carrier gondolas, the necessary backup mechanics like interruption and separation devices can be dispensed with. These serious disadvantages are systematically avoided by the proposed approach and therefore no longer relevant.

Below, preferred embodiments of the invention's product flow regulator are described based on the attached drawings. In the drawings are shown:

FIG. 1a-c a schematic representation of a product flow regulators in three views FIG. 2 an enlarged representation of the guide and drive device of a gondola FIG. 3 another embodiment of the guide and drive device FIG. 4 a schematic representation of an embodiment variant of the system FIG. 5 a schematic representation of an embodiment variant of the system In the side view of FIG. 1a is shown, as in the known product flow regulators, a product flow regulator 1 between a product inlet belt 2 and a product outlet belt 3. FIG. 1b shows a top view of the system and FIG. 1c shows a section along plane A-A of FIG. 1a. Products come from manufacturing on the product inlet belt and are carried further to the packaging system. As is known, they are stored temporarily in the product flow regulator.

The product flow regulator has a frame 4 on which a stationary circumferential guide track 5 is arranged. Along this guide track move product carrier gondolas 6 equipped in a known manner with a number of product carrier trays. In contrast to the known product flow regulators, the individual gondolas are not connected to a rotating drive mechanism, such as conveyor chains, but move independent of each other.

The guide track has a vertical ascent section 7 on the product inlet side, a horizontal waiting section 8 connected to it for filled gondolas, a descent section 9 following it on the product outlet side, and a waiting section 10 for empty gondolas arranged in the lower area of the frame. The guide track is closed, but has a turnout 11 between the descent section and the lower waiting section where the individual gondolas can be slid out.

The guide track has a circumferential guide rail 12, with which the gondolas are guided. Accordingly, the gondolas are equipped with guide rollers 17, as will be further described below with reference to FIGS. 2 and 3. In the vertical sections and the lower horizontal section, an additional guide rail 13 is provided so the guide rollers of the gondolas are guided there on both sides.

The guide track further comprises a circumferential toothed rail 14 arranged next to the rail, which engages a drive wheel 18 of the gondola form-fitting.

Each gondola is provided with its own independent guide and drive means 15, arranged approximately in the upper third of the gondola. An embodiment of this guide and drive means of a gondola is shown in FIG. 2. On a continuous drive shaft 16 on both sides of the gondola are arranged a freely rotatable guide roller 17 and a drive roller 18 non-rotatably connected with the shaft. The guide roller runs, as already mentioned, on the guide track and the drive roller engages the toothed rail. At one end of the drive shaft is arranged a servomotor 19 that drives the shaft. Opposite the outside of the motor a bus bar 20 is mounted on the frame that supplies the motor with power, preferably without contact.

The toothed rail is made of an elastomeric material in the manner of a toothed belt. Of course, other embodiments are possible.

The commands to the servomotor necessary for advancing the gondolas on the guide track are controlled in a known manner through a central computer.

In the embodiment variant shown in FIG. 3, the guide rail 21 at the same time serves as the power supply. The drive is provided by a linear motor 22.

The inventive solution with independently moved product carrier gondolas has the advantage that the shape of the system can be largely customized and thus easily adapted to existing spaces. FIG. 4 shows a variant in which the frame is adapted to a narrow high space. Here the vertical sections can be shared for the waiting position of the gondolas. FIG. 5 shows a variant adapted to a more complicated room shape. A conventional product flow regulator with gondolas suspended from chains could hardly be installed in such a space at a reasonable cost.

Another advantage of the inventive solution is that the gondolas can be guided so they do not touch in the waiting positions. This provides a significant reduction of the considerable noise with gondolas suspended on chains. In addition, the vibrations acting on the product are greatly reduced by eliminating the transfer processes at the transitions from vertical to horizontal chain strands and rails.

The invention claimed is:

1. A product flow regulator, comprising:
a closed loop circumferential guide track along which carrier gondolas are guided between a product inlet area and a product outlet area,
each of the carrier gondolas is equipped with at least one independent guide and at least one independent drive, and the at least one independent drive includes a motor, wherein
the closed loop circumferential guide track and the carrier gondolas take over products from an inlet belt of a production line at the product inlet area by product carrier trays arranged on the carrier gondolas loading the products, the carrier gondolas moving with the products on the product carrier trays to the product outlet area to thereby provide an intermediate storage of the products, the product carrier trays unloading the products to an outlet belt of the production line, and emptied carrier gondolas moving back to the product inlet area.

2. The product flow regulator according to claim 1, wherein the at least one independent drive includes a drive shaft on which drive rollers are mounted, and the motor is a servo motor that drives the drive shaft.

3. The product flow regulator according to claim 1, wherein the closed loop circumferential guide track includes a horizontal waiting section to extend an intermediate storage time of the products.

4. The product flow regulator according to claim 1, further comprising a fixed frame in which the closed loop circumferential guide track is arranged.

5. The product flow regulator according to claim 1, wherein the closed loop circumferential guide track includes a turnout to slide individual carrier gondolas in and out.

6. A product carrier gondola for use in the product flow regulator according to claim 1, comprising a drive on at least two sides of the product carrier gondola.

7. The product carrier gondola according to claim 6, further comprising an electrical control system for individual guidance along the closed loop circumferential guide track that is stationary.

\* \* \* \* \*